United States Patent Office 2,872,428
Patented Feb. 3, 1959

2,872,428

POLYEPOXIDE EMULSIONS AND METHOD OF TREATING TEXTILES THEREWITH

Carl W. Schroeder, Orinda, Calif., assignor to Shell Development Company, New York, N. Y., a corporation of Delaware No Drawing. Application January 31, 1955
Serial No. 485,300

18 Claims. (Cl. 260—29.2)

This invention relates to a new class of water repellent compositions and to a method for using the same. More particularly, the invention relates to a new class of water repellent compositions containing polyepoxides, and to the use of these compositions in the treatment of fabrics, paper, synthetic films, leather and the like.

Specifically, the invention provides new compositions of matter which are particularly useful as water repellent agents for a great variety of materials which comprise a liquid medium containing a polyepoxide having a plurality of

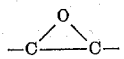

groups and a dissimilar long chain organic compound having a continuous chain of at least 12 aliphatic carbon atoms and at least one functional group reactive with epoxy groups, and preferably at least one functional group having a reactive hydrogen, such as a phenolic hydroxyl group, an amine and N-substituted amino group, an amide group, a carboxyl group, a mercapto group, an aldehyde or an acetylenic group.

The invention further provides a process for using the above-described composition in the treatment of materials, such as fabrics, paper, synthetic films, leather and the like, to render them more water repellent, which comprises applying the above-described novel composition to the desired materials, and then heating the treated material to effect the cure of the polyepoxide.

In the finishing of fabrics and other materials that are to be used outdoors or in applications where they may come in contact with moisture, it is highly desirable that some water repellent properties be imparted thereto. It is important, however, that the composition applied as the water repellent agent does not objectionably alter the hand or feel of the treated material or add excess weight thereto. In addition, the application of the water repellent composition should not have any deleterious action on physical properties of the materials such as their tear and tensile strength and abrasion resistance. Furthermore, it is desirable that the water repellency imparted to the material be durable, i. e., should be resistant to repeated launderings and dry cleaning operations.

Many of the materials needing water repellent properties are also deficient in resistance to creasing and shrinking, and it would be highly desirable if improvement in these properties could also be accomplished in the same treatment imparting the water repellency.

It is an object of the invention to provide a new class of water repellent compositions and a method for their preparation. It is a further object to provide new water repellent compositions which impart a high degree of water repellency without affecting the hand and feel of the material being treated. It is a further object to provide new water repellent compositions which do not have any deleterious action on the physical properties of the treated materials. It is still a further object to provide new compositions which impart water repellency that is resistant to repeated launderings and dry cleanings. It is still a further object to provide new water repellent compositions for treating fabrics, papers, synthetic films and the like, which also impart some crease and shrink resistance. It is a further object to provide a method for applying the above-described new compositions to materials to improve their water repellency. Other objects of the invention will be apparent from the following detailed description thereof.

It has now been discovered that these and other objects are accomplished by the novel compositions of the invention comprising liquid mediums containing a polyepoxide and a dissimilar long-chain organic compound having a continuous chain of at least 12 aliphatic carbon atoms and at least one functional group reactive with epoxy groups and preferably a functional group having a reactive hydrogen atom, such as a phenolic hydroxyl group, an amine or substituted amino group, an amide group, a carboxyl group, a mercapto group, an aldehyde or an acetylenic group. It has been found that when these compositions are applied to materials, such as textile fabrics, paper, synthetic films and the like, and the treated materials heated at elevated temperatures, the resulting treated materials have a high degree of water repellency. Furthermore, the materials treated in this manner have no great change in weight and still have the same feel and hand as before the treatment with the water repellent composition. In addition, the application of the above-described water repellent compositions has little or no effect on the physical properties of the materials, such as tensile and tear strength and abrasion resistance.

It has also been surprisingly found that in addition to imparting the above-noted improvement in water repellency, the above-described compositions also give some improvement in crease and shrink resistance to materials, such as the textile fabrics, which are deficient in these properties.

The polyepoxides to be used in the process of the present invention comprise the organic materials having at least two epoxy groups, i. e.

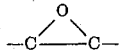

groups per molecule. The polyepoxides may be saturated or unsaturated, aliphatic, cycloaliphatic, aromatic or heterocyclic and may be substituted if desired with other substituents, such as hydroxyl groups, halogen atoms, ether radicals, and the like. They may also be monomeric or polymeric.

For clarity, many of the polyepoxides and particularly those of the polymeric type will be described throughout the specification and claims in terms of epoxy equivalent value. The meaning of this expression is described in U. S. 2,633,458.

If the polyepoxide material consists of a single compound and all of the epoxy groups are intact, the epoxy equivalency will be integers, such as 2, 3, 4 and the like. However, in the case of the polymeric type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such as 1.5, 1.8, 2.5, and the like.

Examples of the polyepoxides include, among others, epoxidized triglycerides as epoxidized glycerol trioleate and epoxidized glycerol trilinoleate, the monoacetate of epoxidized glycerol dioleate, 1,4-bis(2,3-epoxypropoxy)

benzene, 1,3-bis(2,3-epoxypropoxy)benzene, 4,4'-bis(2,3-epoxypropoxy)diphenyl ether, 1,8-bis(2,3-epoxypropoxy)-octane, 1,4-bis(2,3-epoxypropoxy)cyclohexane, 4,4'-bis-(2 - hydroxy - 3,4' - epoxybutoxy)diphenyldimethylmethane, 1,3 - bis(4,5 - epoxypentoxy)-5-chlorobenzene, 1,4-bis(3,4-epoxybutoxy)-2-chlorocyclohexane, 1,3-bis-(2-hydroxy-3,4-epoxybutoxy)benzene, 1,4-bis and (2-hydroxy-4,5-epoxypentoxy)benzene.

Other examples include the epoxy polyethers of polyhydric phenols obtained by reacting a polyhydric phenol with a halogen containing epoxide in the presence of an alkaline medium. Thus, polyether A described hereinafter, which is substantially 2,2-bis(2,3-epoxypropoxyphenyl)propane is obtained by reacting bis-phenol, i. e. (2,2-bis(4-hydroxyphenyl)propane), with an excess of epichlorohydrin as indicated below. Other polyhydric phenols that can be used for this purpose include resorcinol, catechol, hydroquinone, methyl resorcinol, or polynuclear phenols, such as 2,2-bis(4-hydroxyphenyl) butane, 4,4'-dihydroxybenzophenone, bis(4-hydroxyphenyl)ethane, 2,2-bis(4-hydroxyphenyl)pentane, and 1,5-dihydroxynaphthalene. The halogen-containing epoxides may be further exemplified by 3-chloro-1,2-epoxybutane, 3-bromo-1,2-epoxyhexane, 3-chloro-1,2-epoxyoctane, and the like.

Preferred polyepoxides of this type are the glycidyl polyethers of dihydric phenols obtained by reacting epichlorohydrin with a dihydric phenol in an alkaline medium. The monomer products of this type may be represented by the general formula

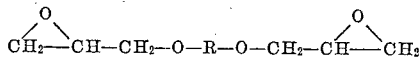

wherein R represents a divalent hydrocarbon radical of the dihydric phenol. The polymeric products will generally not be a single simple molecule but will be a complex mixture of glycidyl polyethers of the general formula

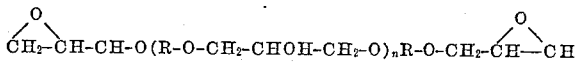

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of material with one or both of the terminal glycidyl radicals in hydrated form.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

The preparation of some of the glycidyl polyethers of dihydric phenols will be illustrated below. Unless otherwise specified, parts indicated are parts by weight.

PREPARATION OF GLYCIDYL POLYETHERS OF DIHYDRIC PHENOLS

*Polyether A.*—About 2 moles of bis-phenol was dissolved in 10 moles of epichlorohydrin and 1% to 2% water added to the resulting mixture. The mixture was then brought to 80° C. and 4 moles of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal quantity by weight of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value eq./100 g. of 0.50 so the epoxy equivalency was 1.75. For convenience, this product will be referred to hereinafter as polyether A.

*Polyether B.*—A solution consisting of 11.7 parts of water, 1.22 parts of sodium hydroxide, and 13.38 parts of bis-phenol was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at a temperature of 20° C. and 30° C. was started 30 minutes later and continued for 4½ hours. The product was dried by heating to a final temperature of 140° C. in 80 minutes, and cooled rapidly. At room temperature, the product was an extremely viscous semi-solid having a melting point of 27° C. by Durran's mercury method and a molecular weight of 483. The product had an epoxy value eq./100 g. of 0.40 so the epoxy equivalency was 1.9. For convenience, this product will be referred to as polyether B.

*Polyether C.*—About 228 parts of bis-phenol and 84 parts sodium hydroxide as a 10% aqueous solution were combined and heated to about 45° C. whereupon 176 parts of epichlorohydrin was added rapidly. The temperature increased and remained at about 95° C. for 80 minutes. The mixture separated into a two-phase system and the aqueous layer is drawn off. The resinous layer that remained is washed with hot water and then drained and dried at a temperature of 130° C. The Durran's mercury method melting point of the resulting product is 52° C. and the molecular weight is about 710. The product has an epoxy value of 0.27 eq./100 g. so the epoxy equivalency is 1.9.

*Polyether D.*—By using a smaller ratio of epichlorohydrin to bis-phenol, a glycidyl polyether of higher melting point was obtained. Thus, polyether D was obtained in the same manner as polyether C except that for every mole of bis-phenol, there was used 1.57 moles of epichlorohydrin and 1.88 moles of sodium hydroxide. This provided a product having a melting point of about 70° C., a molecular weight of 900 and an epoxide value of 0.20 eq./100 g.

*Polyether E.*—This glycidyl polyether of still higher melting point was prepared in like manner to that of polyether C except that for each mole of bis-phenol there was employed 1.22 moles of epichlorohydrin and 1.37 moles of sodium hydroxide. The resulting product had a melting point of 98° C., a molecular weight of 1400 and an epoxide value of 0.103 eq./100 g.

Glycidyl polyethers of higher molecular weight and softening point are best prepared by reacting a lower polyether with less than an equimolecular amount of dihydric phenol. Thus upon heating the above-noted product which has a softening point of 98° C. to a temperature of about 150° C. and then adding 5% by weight of bis-phenol after which the temperature is gradually increased to 190° C. in about 30 minutes followed by maintaining the temperature at this point for an additional 1½ hours, there is obtained a glycidyl polyether having a softening point of 131° C., an epoxy value of 0.05 equivalents of epoxy per 100 grams and a molecular weight of 2900.

Preferred members of the above-described group of polyepoxides are the glycidyl polyethers of the dihydric phenols, and especially 2,2-bis(4-hydroxyphenyl)propane, having an epoxy equivalency between 1.0 and 2.0 and a molecular weight between 300 and 900. Particularly preferred are those having a Durran's mercury method softening point no greater than 60° C.

The glycidyl polyethers of polyhydric phenols obtained by condensing the polyhydric phenols with epichlorohydrin as described above, are also referred to as "ethoxyline" resins. See Chemical Week, vol. 69, page 27, for September 8, 1951.

Another group of polyepoxides that may be used in preparing the emulsions comprise the glycidyl ethers of novalac resins which resins are obtained by condensing an aldehyde with a polyhydric phenol. A typical member of this class is the epoxy resin from formaldehyde 2,2-bis(5-hydroxyphenol)propane novalac resin which contains as predominant constituent the substance represented by the formula

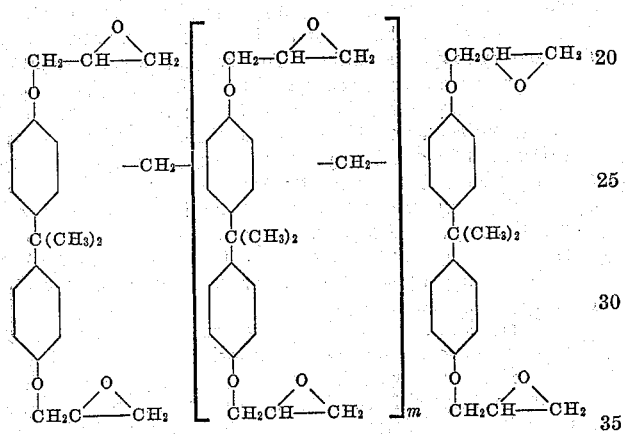

wherein $m$ is a value of at least 1.0. For the nature and preparation of novalac resins, see the book by T. S. Carswell, Phenoplasts, 1947, page 29, et seq.

Another group of polyepoxides include the glycidyl polyethers of a polyhydric phenol which has two hydroxyaryl groups separated by an aliphatic chain of at least six carbon atoms in the chain and with the chain being attached by carbon-to-carbon bonding to a nuclear carbon atom of the hydroxyl aryl groups. Suitable phenols used for preparing these resins comprise those obtained by condensing phenol with a phenol having an aliphatic side chain with one or more olefinic double bonds positioned in the chain so the required separating atoms are present between two hydroxyphenol groups of the resulting polyhydric phenol. Cardanol, obtainable in known manner from cashew nut shell liquid, is a convenient source of phenols containing such side chain. Mixed grades of cardanol containing about equal amounts of m-(8-pentadecenyl) phenol and a phenol with a 15 carbon atom side chain having two double bonds similarly removed from the aromatic nucleus are available from the Irvington Varnish and Insulator Co.

*Polyether F.*—A mixture of 250 parts of phenol and 20 parts of BF₃-ether complex containing about 48% BF₃ was heated at 55–60° C. while adding 150 parts of the above-noted mixed grade of Cardanol obtained from Irvington Varnish and Insulator Co., over a period of one hour. The reaction mixture was stirred rapidly during the addition and for about 75 minutes thereafter. The reaction was stopped by addition of 30 parts of concentrated ammonium hydroxide solution.

The reaction product was washed four times with 100 parts portions of water at 85–95° C. and was then subjected to distillation. Unreacted phenol was removed by co-distillation with water, additional water being added to the distillation vessel from time to time. The distillation was continued until the distillate was essential free of phenol as detected by formation of blue color with ferric chloride.

One hundred parts of the polyhydric phenol was dissolved in 260 parts of epichlorohydrin and 1 part of water was added. The solution was heated to reflux and 25 parts of pellets of sodium hydroxide were added in 5 part portions at intervals of 15 minutes. The reaction mixture held at reflux for an additional hour and then the epichlorohydrin and water were distilled off. The product was then dissolved in about 175 parts of toluene and salt removed by filtration. The toluene was removed by distillation to a temperature of 110° C. at 35 mm. pressure the product was a viscous liquid which analyzed as follows:

| | |
|---|---|
| Molecular weight | 603 |
| Epoxide equivalents per 100 gms | 0.306 |
| Epoxide equivalents per mol | 1.84 |
| Hydroxyl equivalents per 100 gms | 0.023 |
| Chlorine, percent | 0.37 |

Examples of the polymeric-type polyepoxides include the polyepoxypolyhydroxy polyethers obtained by reacting, preferably in an alkaline medium, a polyhydric alcohol or polyhydric phenol with a polyepoxide, such as the reaction product of glycerol and bis(2,3-epoxypropyl)-ether, the reaction product of sorbitol and bis(2,3-epoxy-2-methylpropyl)ether, the reaction product of pentaerythritol and 1,2-epoxy-4,5-epoxypentane, and the reaction product of bis-phenol and bis(2,3-epoxy-2-methylpropyl)ether, the reaction product of resorcinol and bis(2,3-epoxypropyl)ether, and the reaction product of catechol and bis(2,3-epoxypropyl)ether.

A further group of polyepoxides comprises the polyepoxy polyethers obtained by reacting, preferably in the presence of an acid-acting compound, such as hydrofluoric acid, one of the aforedescribed halogen-containing epoxides with a polyhydric alcohol, and subsequently treating the resulting product with an alkaline component. As used herein and in the claims, the expression "polyhydric alcohol" is meant to include those compounds having at least two free alcoholic OH groups and includes the polyhydric alcohols and their ethers and esters, hydroxy-aldehydes, hydroxyketones, halogenated polyhydric alcohols, and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, inositol, trimethylolpropane (bis(4-hydroxycyclohexyl)dimethylmethane, 1,4 - dimethylolbenzene, 4,4 - dimethyloldiphenyl, dimethyloltoluenes, and the like. The polyhydric ether alcohols include, among others, diglycerol, triglycerol, dipentaerythritol, tripentaerythritol, dimethylolanisoles, beta - hydroxyethyl ethers of polyhydric alcohols, such as diethylene glycol, polyethylene glycols, bis(beta-hydroxyethyl ether) of hydroquinone, bis(beta-hydroxyethyl ether) of bisphenol, beta-hydroxyethyl ethers of glycerol, pentaerythritol, sorbitol, mannitol, etc., condensates of alkylene oxides, such as ethylene oxide, propylene oxide, butylene oxide, isobutylene oxide, glycidyl, epichlorohydrin, glycidyl ethers, etc., with polyhydric alcohols, such as the foregoing and with polyhydric thioethers, such as 2,2-dihydroxydiethyl sulfide, 2,2'-3,3'-tetrahydroxy dipropyl sulfide, etc. The hydroxyaldehydes and ketones may be exemplified by dextrose, fructose, maltose, glyceraldehyde. The mercapto (thiol) alcohols may be exemplified by alpha - monothioglycerol, alpha,alpha-dithioglycerol, etc. The polyhydric alcohol esters may be exemplified by monoglycerides, such as monostearin, monoesters of pentaryethritol and acetic acid, butyric acid, pentanoic acid, and the like. The halogenated polyhydric alcohols may be exemplified by the monochloride of pentaerythritol, monochloride of sorbitol, monochloride of mannitol, monochloride of glycerol, and the like.

The preparation of some of these polyepoxy polyethers may be illustrated by the following:

PREPARATION OF GLYCIDYL POLYETHERS OF POLYHYDRIC ALCOHOLS

*Polyether G.*—About 276 parts (3 moles) of glycerol was mixed with 832 parts (9 moles) of epichlorohydrin. To this reaction mixture was added 10 parts of diethyl ether solution containing about 4.5% boron trifluoride. The temperature of this mixture was between 50° C. and 75° C. for about 3 hours. About 370 parts of the resulting glycerol-epichlorohydrin condensate was dissolved in 900 parts of dioxane containing about 300 parts of sodiumaluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 150° C. at 20 mm. pressure. The polyglycidyl ether, in amount of 261 parts, was a pale yellow viscous liquid. It had an epoxide value of 9.671 equivalents per 100 grams and the molecular weight was 324 as measured ebullioscopically in dioxane solution. The epoxy equivalency of this product was 2.13. For convenience, this product will be referred to hereinafter as polyether G.

*Polyether H.*—10.5 moles of ethylene oxide was bubbled through 3.5 moles glycerine containing an acid catalyst at 40–50° C. The resulting product had a molecular weight of 224 and a hydroxyl value of 1.417 eq./100 g. 101 parts of this ethylene oxide glycerine condensate was placed in a reaction kettle and heated to 65–70° C. Sufficient BF$_3$-ethyl ether complex was added to bring the pH to about 1.0 and then 132 parts of epichlorohydrin added dropwise. After all the epichlorohydrin had been added, the reaction was continued for about 15 minutes to assure complete reaction. This product was then dissolved in benzene and 57 parts of sodium hydroxide were added in 7 equal portions at about 87–89° C. over a period of ¾ hour and then filtered to remove the salt. The solvent and light ends were then removed by stripping at a low vacuum. The resulting product had a molecular weight of 455, and an epoxy value of .524 eq./100 g. For convenience, this polyether will be referred to herein as polyether H.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products preferably have an epoxy equivalency greater than 1.0, and still more preferably between 1.1 and 4 and a molecular weight between 300 and 1000.

Another group of polyepoxides include the epoxy esters of polybasic acids, such as diglycidyl, phthalate and diglycidyl adipate, diglycidyl tetrahydrophthalate, diglycidyl maleate, epoxidized dimethallyl phthalate and epoxidized dicrotyl phthalate.

Other polyepoxide compounds include the polymers and copolymers of the epoxy-containing monomers possessing at least one polymerizable ethylenic linkage. When this type of monomer is polymerized in the substantial absence of alkaline or acidic catalysts, such as in the presence of heat, oxygen, peroxy compound, actinic light, and the like, they undergo additional polymerization at the multiple bond leaving the epoxy group unaffected. These monomers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chlorallyl acetate, and vinyl methallyl pimelate. Illustrative examples of these polymers include poly(allyl 2,3-epoxypropyl ether), poly-(2,3-epoxypropyl crotonate), allyl 2,3-epoxypropyl ether-styrene copolymer, methallyl 3,4-epoxybutyl ether-allyl benzoate copolymer, poly(vinyl 2,3-epoxypropyl ether), allyl glycidyl ether-vinyl acetate copolymer and poly(4-glycidyloxystyrene).

These polymers are preferably prepared by heating the monomer or monomers in bulk or in the presence of an inert solvent such as benzene in the presence of air or a peroxy catalyst, such as ditertiary-butyl peroxide, at temperatures ranging from 75° C. to 200° C.

The preparation of polymers of this type may be illustrated by the following example showing the preparation of poly(allyl glycidyl ether).

PREPARATION OF POLYMERS OF UNSATURATED GLYCIDYL ETHERS

*Polyether I.*—About 100 parts of allyl glycidyl ether was dissolved in an equal amount of benzene and the resulting mixture heated at 155° C. in the presence of 3% ditertiary-butyl peroxide. The solvent and unreacted monomer were then removed by distillation. The poly-(allyl glycidyl ether) obtained as the resulting product had a molecular weight of about 481–542 and an epoxy value of 0.50 eq./100 g. For convenience, this product will be referred to hereinafter as polyether G.

Particularly preferred members of the above-described group comprise the polymers of the 2-alkenyl glycidyl ethers having a molecular weight between 300 and 1000 and an epoxy equivalency greater than 1.0 and preferably between 1.2 and 6.0.

Of special interest are the polyepoxides containing only carbon, hydrogen, oxygen and chlorine.

The particularly preferred polyepoxides have solubility in water varying from no solubility up to about 20 parts per 100 parts of water at room temperature, and more preferably up to about 15 parts per 100 parts of water.

The long chain compounds to be added to the emulsions comprise the dissimilar organic compounds having a continuous chain of at least 12 aliphatic carbon atoms and at least one functional group reactive with epoxy groups. These functional groups include epoxy groups, i. e.,

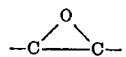

groups, anyhydride groups, i. e.,

groups, and groups having active hydrogen, such as a phenolic hydroxyl group; an amine or substituted amino group, an amide group, a carboxyl group, a sulfonic acid group, a mercapto group, an aldehyde or acetylenic group. Examples of these long chain compounds include, among others, octadecyl succinic anhydride, eicosylsuccinic anhydride, 1-octadecenylsuccinic anhydride, pentadecyl-phthalic anhydride, tetradecylamine, hexadecylamine, octadecylamine, eicosanylamine, N-octadecyl propylamine, N-eicosyl octylamine, N-octadecenyl methylamine, octadecyl-1,18-diamine, hexadecyl-1,16-diamine, 1,-2-epoxyoctadecane, 1,2-epoxyhexadecane, 1,2-epoxyeicosane, 1,2-epoxydocasane, glycidyl ester of eicosanoic acid, glycidyl dodecyl ether, glycidyl octadecyl ether, epoxidized soybean oil, pentadecylphenol, pentadecyl resorcinol, octadecylphenol, 3,4-dioctadecylphenol, octadecanoic acid, heptadecanoic acid, eicosanoic acid, 1,20-eicosanedioic acid, 1,18-eicosadienedioic-1,20 acid, pentadecanethiol, 1,18-octadecanedithiol, 1,20-eicosanedithiol, hexadecanethiol, docosanedithiol, octadecanesulfonic acid, pentadecanesulfonic acid, eicosane-1,2-disulfonic acid, 1,20-eicosanediamide, octadecanamide, hexadecanamide, and N-allyl eicosaneamide.

Especially preferred members of the above-described group comprise the long open chained aliphatic hydrocarbons substituted with just one functional group which is a member of the group consisting of an epoxy group, an anhydride group, a phenolic hydroxy group, an amino or N-alkyl substituted amino group, a carboxyl group, a mercapto group and an aldehyde group and containing from 16 to 32 carbon atoms, such as, for example, 1,2-epoxyoctadecane, 1,2-epoxyeicosane, 1,2-epoxydocosane, 1,2-epoxypentacosane, 1,2-epoxyoctacosane, 1,2-epoxytriacosane, octadecyl ether, glycidyl ester of eicosanoic acid, glycidyl ester of docosanoic acid, glycidyl octadecyl ether, hexadecylphenol, octadecylphenol, docosylphenol, hexacosylphenol, octadocosylamine, docosylamine, tricosylamine, N-butyl docosylamine, N-octyl tricosylamine, N-decyl octacosylamine, octadecanethiol, hexadecanethiol, pentacosanethiol, octacosanethiol, nonadecanal, eicosanal, octadecanoic acid, octadecanesulfonic acid, eicosanoic acid, eicosanesulfonic acid, and triconsanoic acid.

The water repellent compositions of the present invention are prepared by combining any one or more of the above-described polyepoxides with any or more of the above-described long-chain compounds in a liquid medium, such as an aqueous emulsion.

The amount of the polyepoxide added to the liquid medium may depend upon the intended application and method of applying the liquid to the surface. Preferably the amount of the polyepoxide to be applied to the surface of the material will vary from about 3% to 50% by weight of the water. If a 100% pick-up is allowed and the solution is applied but once, the liquid medium should then contain the polyepoxide in amounts varying from 3% to 20% in order to apply the same percentages to the cloth. On the other hand, if say only a 30% pick-up is allowed and the solution applied but once, the impregnating liquid should contain the material in amounts varying from 6% to 40% in order to apply the material in the preferred amounts of 3% to 20%. In general application, the liquid is applied but once with pick-ups varying from 55% to 100%.

The amount of the long-chain compound to be added to the liquid medium will preferably be at least one third (by weight) of that of the polyepoxide added, and more preferably from one third to 1.5 times that of the polyepoxide.

The liquid medium used in preparing the novel compositions of the invention may contain solvents or other liquid materials useful in forming liquid impregnating compositions. The compositions are, however, preferably prepared in aqueous and preferably aqueous emulsion solutions. The aqueous emulsions may be prepared with a variety of emulsifying agents, but the more preferred stable and superior emulsions are prepared by employing an acid and alkali stable non-ionic emulsifying agent in combination with a stabilizing colloid. The expression "acid and alkali stable" as used herein in reference to the emulsifying agent means the agents that, when employed in preparing an aqueous emulsion, are not coagulated or settled out, when contacted with acids, such as hydrogen chloride or alkali such as sodium hydroxide. The expression "non-ionic" refers to those which are not salts and not subject to ionization when dissolved in water. Examples of these agents include, among others, partial esters of polyhydric alcohols and saturated or unsaturated fatty acids and preferably fatty acids containing at least 6 and more preferably from 12 to 18 carbon atoms and hexitans and hexitides such as sorbitan or mannitan monolaurate, monopalmitate, monostearate, monooleate, or the monoesters of coconut oil fatty acids and like products described in U. S. 2,322,820. Other examples of partial esters of this type include the pentaerythritol mono- and di-palmitate, pentaerythritol mono- and distearate, pentaerythritol mono- and dioleate, 1,2,6-hexanetriol mono- and dicaproate, 1,2,6-hexanetriol mono- and dioleate, trimethylolpropane distearate, trimethylolpropane dilaurate, polyglycerol dilaurate, inositol monolaurate, glucose monostearate, sucrose monooleate, polyglycol monooleate, polyglycol monostearate, and the like.

Examples of other suitable non-ionic emulsifying agents include the hydroxypolyoxyalkylene ethers of the above-described partial esters. Preferred methods of this group include the polyalkylene glycol ethers of partial ester such as are prepared by reacting an olefin oxide like ethylene oxide with the fatty acid esters of the inner ethers of hexitol in the manner described in U. S. 2,380,166. Specific emulsifiers of this class include, among others, the polyethylene glycol ethers of sorbitan or mannitan monolaurate, monopalmitate, monooleate or monostearate. Other examples of this type include, the polyethylene glycol ethers or pentaerythritol mono- and dipalmitate, pentaerythritol mono- and distearate, pentaerythritol mono- and dioleate, trimethylolpropane distearate, polyglycerol dilaurate, inositol monolaurate, glucose monostearate and the like.

Examples of other suitable non-ionic emulsifying agents include the di- and monoethers of polyhydric compound and particularly the polyalkylene glycols. Especially preferred are the aryl and alkaryl polyethylene glycol ethers such as phenyl polyethylene glycol monoether, xylyl polyethylene glycol monoether, isopropylphenyl polyethylene glycol monoether and the like.

The amount of the emulsifying agent employed in the preparation of the emulsions of the invention will vary over a considerable range depending upon the polyepoxide selected and the type of emulsifying agent. In general, the amount of the emulsifying agent will vary from about 10% to 150% by weight of the polyepoxide, and more preferably from 20% to 100% by weight of the polyepoxide. The above-described partial fatty acid esters of polyhydric alcohols and their partial ethers are preferably employed in amounts varying from about 20% to 80% by weight of the polyepoxide.

The water-dispersible binding colloid employed in the preparation of the emulsions of the present invention are preferably the polyvinyl alcohols, homopolymers and copolymers of unsaturated acids, such as methacrylic acid, maleic acid and fumaric acid with other unsaturated monomers, such as styrene, alpha-methylstyrene, acrylonitrile, vinyl acetate, vinyl chloride, methyl methacrylate, vinylidene chloride, and the like, polymers of vinyl esters which have been partially deacylated so as to render them water-dispersible, such as partially deacylated polyvinyl acetate, polyvinyl butyrate, polyvinylbenzoate, and the like, and salts of such polymers and copolymers. Examples of other suitable binding colloids include methylcellulose carboxymethylcellulose, starch, gelatine, starch degradation products such as dextrine, and the like, and mixtures thereof.

Preferred water-dispersible binding colloids to be used include the polyvinyl alcohols, carboxymethylcellulose, methylcellulose and copolymers of maleic acid.

The water-dispersible binding colloid should be employed in the emulsion in amounts varying from about .1% to 15% by weight of the polyepoxides. Preferably the binding colloid is utilized in amounts varying from 3% to 10% by weight of the polyepoxide.

The emulsion is preferably prepared by mixing the polyepoxide, long chain derivative and emulsifying agent, adding the water-dispersible binding colloid and then adding warm or hot water with slow stirring until the emulsion inverts. Following the inversion, warm to hot water can be added as rapidly as desired to bring the emulsion up to the desired solution. In some cases, the polyepoxide will be in solid form and it may be necessary to melt the material at temperatures below about 100° C. before it can be mixed with the emulsifying agent.

If the long-chain derivative is polyfunctional, the curing the polyepoxides on the material to be treated may be accomplished by merely heating the treated material as indicated hereinafter. On the other hand, if the long chain derivative possesses only one functional group it will be necessary to utilize an epoxy curing agent. These agents may be added during the preparation of the emulsion or afterwards. The agent may be added as such or may be prepared in the form of an aqueous emulsion and this emulsion then added to the above-described emulsion of the polyepoxide. If applied afterwards the curing agents may be sprayed or brushed onto the surfaces already coated with the emulsion.

Curing agents that may be employed include acid-acting curing agents, such as the organic and inorganic acids and anhydrides as citric acid, acetic acid, acetic acid anhydride, butyric acid, caproic acid, phthalic acid, phthalic acid anhydride, tartaric acid, aconitic acid, oxalic acid, succinic acid anhydride, latic acid, maleic acid, maleic acid anhydride, fumaric acid, glutaconic acid, 1,2,4-butanetricarboxylic acid, isophthalic acid, terephthalic acid, malonic acid, 1,1,5-pentanetricarboxylic acid, acetoacetic acid, naphthalic acid, trimellitic acid, phosphoric acid, boric acid, sulfonic and phosphonic acids, perchloric acid, persulfuric acid, boron-trifluoride complexes, such as the p-cresol and urea complex, amino compounds, such as ethylene diamine, diethylene triamine, triethylene tetramine, dicyandiamide, melamine, pyridine, cyclohexylamine, benzyldimethylamine, benzylamine, diethylaniline, triethanolamine, piperidine, tetramethyl piperazine, N,N-dibutyl-1,3-propane diamine, N,N-diethyl-1,3-propane diamine, 1,2-diamino-2-methylpropane, 2,7-diamino-2,6-dimethyloctane, dibutylamine, dioctylamine, dinonylamine, distearylamine, diallylamine, o-tolylnaphthylamine, pyrrolidine, 2-methylpyrrolidine, tetrahydropyridine, 2-methylpiperidine, tetrahydropyridine, 2-methylpiperidine, diaminopyridine, tetraethylpentamine, meta-phenylene diamine, and the like. Salt of inorganic acids, such as zinc fluoborate, magnesium fluoborate, magnesium perchlorate, potassium persulfate, copper fluoborate, copper persulfate, cobaltic fluoborate, chromic nitrate, magnesium nitrate, calcium phosphite, and the like, may also be used.

Preferred curing agents to be employed are the polycarboxylic acids and their anhydrides, the primary and secondary aliphatic and aromatic amines and the salts of metals of groups I to IV and VIII of the Periodic Table of Elements and inorganic acids the anion portion of which contains at least two dissimilar elements having an atomic weight above 2, and particularly inorganic acids of the formula $$H_a[(X)_w(Z)_y]$$

wherein X is a non-metal having an atomic weight above 2, Z is an element which tends to gain from 1 to 2 electrons in its outer orbit, such as oxygen and fluorine, $w$ is an integer, $y$ is an integer greater than 1 and $a$ equals the valency of the radical $(X)_w(Z)_y$, such as sulfuric acid, fluoboric acid, fluosilicic acid, persulfuric acid, phosphoric acid and the like.

The acids, salts and amine curing agents as described above are particularly useful when using the aqueous emulsions in the treatment of synthetic fibers.

Coming under special consideration as curing agents, particularly when emulsions are used in the treatment of cellulose fabrics are the acid anhydrides. Acid anhydrides that may be utilized in this special application include, among others, succinic anhydride, alkyl and alkenyl-substituted succinic anhydrides, chlorendic anhydride, phthalic anhydride, adipic anhydride, cyclohexene-1,2-dicarboxylic acid anhydride, and mixtures thereof. Particularly preferred are the aromatic polycarboxylic acid anhydrides, aliphatic and cycloaliphatic dicarboxylic acid anhydrides and their halogenated derivatives.

The amount of the curing agent employed will vary depending upon the type of agent selected. In general, the amount of the curing agent will vary from about 0.5% to 30% by weight of the polyepoxide. The acids are preferably employed in amounts varying from about 0.5% to 20%, the metal salts are preferably employed in amounts varying from about 1% to 15%, and the anhydrides are preferably employed in stoichiometric amounts, i. e., about one anhydride group for every epoxy group in the polyepoxide.

The liquid medium may be applied to the material to be treated, such as the fabrics, paper, synthetic films, leather, and the like in a variety of different methods. If it is desired to apply the solution only to one surface of the material, as, for example, when it is desired to treat the back only of a material having a face of artificial or natural silk and a cotton back, the application may be effected by spraying or by means of rollers, or the composition may be spread upon the surface by means of a doctor blade. When, however, it is desired to coat both surfaces of the material, or if the material is to be thoroughly impregnated with it, the material may be simply dipped in the solution or run through conventional-type padding rollers. The solutions may also be applied locally to the material, for example, by means of printing rollers or by stencilling.

The amount of the polyepoxide to be deposited on the fabric will depend upon the intended use of the finished product. If the material is to be used for the preparation of soft goods, such as dresses, shirts, and the like, the amount of polyepoxide deposited will generally vary from 3% to 20% by weight of the fabric. For other materials, such as shoe fabrics, draperies, and the like, still higher amounts of the polyepoxide, such as of the order to 25% to 50% by weight may be deposited.

If the desired amount of the polyepoxide deposited in the fabric is not obtained in one application, the solution may be applied again or as many times as desired in order to bring the amount of the polyepoxide up to the desired level.

After the desired amount of liquid has been applied to the material, the treated material is preferably dried for a short period to remove some or all of the dispersing liquid, such as water. This is generally accomplished by exposing the wet sheets to hot gas either slack or framed to dimension at temperatures ranging up to 120° C. The period of drying will depend largely on the amount of pick-up permitted during the application of the solution, and the concentration of the polyepoxide. In most instances, drying periods of from 1 to 30 minutes should be sufficient.

The dried material is then exposed to relatively high temperatures to accelerate the cure of the polyepoxides. Temperatures used for this purpose generally range from 100° C. to 200° C., and more preferably from 130° C. to 190° C. At these preferred temperature ranges the cure can generally be accomplished in from 1 to 10 minutes. Exposures of less than 3 minutes, e. g., 1 minute, may probably be used in continuous, commercial processing.

As indicated above, the compositions of the present invention may be used to impart water repellency to a great variety of different materials which are deficient in this respect. Examples of the materials treated included, among others, natural and synthetic fabrics, paper, synthetic films and coatings, leather and the like. Particularly preferred materials to be treated include the textile fabrics. Examples of textile fabrics include, among others, cotton, linen, natural silk and artificial silk, such as artificial silk obtained from cellulose acetate or other organic esters or ethers of cellulose and the regenerated cellulosic type of artificial silk obtained by the viscose, or cuprammonium process, jute, hemp, rayon, animal fibers, such as wool, hair, mohair, and the like, and mixtures thereof. Also included in the group are the synthetic fibers including the fibers from polyesters, such as for example, the ethylene glycol-terephthalic acid polyesters (Dacron), the acrylic polyvinyls, such as for example the acrylonitrile polymers (Orlon), and copolymers (Dynel—vinyl chloride-acrylonitrile copolymer) the polyethylenes.

polyurethans (Perluran), proteins (Caslen), alginic (alginate rayon), non-acrylic polyvinyls, as vinyl chloride and vinylidene polymers (Vinyon), mineral fibers (Fiberglas), polyamides, such as the aliphatic dicarboxylic acid-polyamide reaction products (nylon), polyvinyl alcohol and the like. While the above process has been described in relation to the treatment of woven fabrics, it should be understood that it can also be applied to other materials, such as knitted or netted fabrics.

To illustrate the manner in which the invention may be carried out, the following examples are given. It is to be understood, however, that the examples are for the purpose of illustration and the invention is not to be regarded as limited to any of the specific materials or conditions recited therein.

Example I

This example illustrates the preparation and use of a water repellent composition containing polyether A and a mixture of $C_{18}$ to $C_{24}$ alkyl amino propyl amine

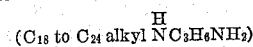

$$(C_{18} \text{ to } C_{24} \text{ alkyl } \overset{H}{N} C_3H_6NH_2)$$

100 parts of polyether A, 57 parts of a mixture of $C_{18}$ to $C_{24}$ alkyl amino propylamine and 5 parts of a polyethylene glycol ether of sorbitan monopalmitate (Tween 40) were mixed together at 100° C. 100 parts of a 5% solution of polyvinyl alcohol (80% hydrolyzed polyvinyl acetate) was slowly added thereto with stirring. Warm water was slowly added until the emulsion inverted and then portions of the emulsion were combined with additional water so as to give solutions having a 5%, 10% and 15% solid content. The resulting products were white creamy emulsions which had good stability.

The above emulsions were padded on cotton cloth by means of a Butterworth-3-Roll laboratory padder. The impregnated sheets were removed and dried at 100° C. and cured for 5 minutes at 160° C. The resulting sheets showed good water repellency. The sheets also showed improved crease recovery.

Related results are obtained by replacing the mixture of $C_{18}$ to $C_{24}$ alkyl amino propylamine with an equivalent amount of eicosylamine.

Example II

This example illustrates the preparation and use of a water repellent composition containing polyether A and an acetic acid amide of a mixture of $C_{18}$ to $C_{24}$ alkyl-amino propylamine.

10 parts of polyether A, 7.3 parts of an acetic acid amide of the mixture of $C_{18}$ to $C_{24}$ alkyl amino propylamine and 5 parts of a polyethylene glycol ether of sorbitan monopalmitate were mixed together at 100° C. 10 parts of a 5% solution of polyvinyl alcohol was slowly added thereto with stirring. Warm water was slowly added until the emulsion inverted and then portions of the emulsions combined with additional water so as to give solutions having a 5%, 10% and 15% solids content. The resulting products were white creamy emulsions which had good stability.

The above emulsions were padded on cotton cloth by means of a Butterworth-3-Roll laboratory padder. The impregnated sheets were removed and dried at 100° C. and cured for 5 minutes at 160° C. The resulting sheets showed good water repellency. The sheets also showed a crease recovery value of 102 compared to a blank of 80.

Example III

This example illustrates the preparation and use of a water repellent composition containing polyether A and dodecenyl succinic anhydride.

6.1 parts of polyether A, 8.3 parts of dodecenyl succinic anhydride, .46 part of stearyl dimethyl amine and .61 part of a polyethylene glycol ether of sorbitan monopalmitate were mixed together at 100° C. 6.1 parts of a 5% solution of polyvinyl alcohol was slowly added thereto with stirring. Water was slowly added until the emulsion inverted and then portions of the emulsion were combined with additional water so as to give solutions having a 5%, 10% and 15% solid content. The resulting products were white creamy emulsions having good stability.

The above emulsions were padded on cotton cloth by means of a Butterworth-3-Roll laboratory padder. The impregnated sheets were removed and dried at 100° C. and cured for 5 minutes at 160° C. The resulting sheets showed good water repellency.

Example IV

This example illustrates the preparation and use of a water repellent composition containing polyallyl glycidyl ether described above and octadecyl amino propylamine.

100 parts of polyallyl glycidyl ether, 55 parts of octadecyl amino propylamine, and 5 parts of a polyethylene glycol ether of sortutan monopalmitate are mixed together at 100° C. 100 parts of a 5% saturation of polyvinyl alcohol (80% hydrolyzed polyvinyl acetate) is slowly added thereto with stirring. Warm water is then added until the emulsion inverts and additional water added to form a solution having 15% solids content.

Cotton cloth is then impregnated with the above emulsion by means of the Butterworth-3-Roll laboratory padder. The impregnated sheets are withdrawn and dried at 100° C. and cured for 5 minutes at 160° C. The resulting sheets show good resistance to water.

Example V

This example illustrates the preparation and use of a water repellent composition containing polyether G and epoxidized 1-octadecene.

100 parts of polyether G, 25 parts of epoxidized 1-octadecene, 25 parts of sorbitan monostearate were mixed together at 100° C. 40 parts of a 5% solution of polyvinyl alcohol was slowly added thereto with stirring. Warm water was slowly added until the emulsion inverted and then additional water added to make a solution having 15% solids content.

7.25 parts of zinc fluoborate was added to the above emulsion and the mixture padded on cotton cloth. The impregnated sheets were dried at 100° C. and cured for 5 minutes at 160° C. The resulting sheets showed good water repellency and a wrinkle recovery value of 134 compared to a blank of 84.

The above composition containing zinc fluoborate was also applied to rayon to give it improved water repellency.

Example VI

This example illustrates the preparation and use of a water repellent composition containing polyether G and pentadecyl phenol.

50 parts of polyether G and 25 parts of pentadecyl phenol were combined with 25 parts of a polyethylene glycol ether of sorbitan monopalmitate and heated to 100° C. 20 parts of 5% polyvinyl alcohol was slowly added thereto with stirring. Warm water was slowly added until the emulsion inverted and additional water added to make a solution having 15% solids content. The resulting product was a white creamy emulsion.

7.5 parts of zinc fluoborate catalyst was added to the above solution and the mixture padded on cotton cloth. The impregnated cloth was dried at 100° C. and cured for 12 minutes at 160° C. the cloth had a soft feel, and excellent water repellency.

Example VII

This example illustrates the preparation and use of a water repellent composition containing polyether G and glycidyl octadecyl ether.

100 parts of polyether G and 25 parts of glycidyl octadecyl ether were added to an aqueous solution containing 540 parts of water, .25 part Methocel, 1.8 parts of a copolymer of vinyl methyl ether and maleic anhydride, .5 part of a polyglycol fatty acid ester and the mixture stirred to form an emulsion.

7.5 parts of zinc fluoborate was added to the above emulsion and the emulsion padded on cotton cloth. The impregnated cloth was dried at 100° C. and cured for 5 minutes at 160° C. The cloth had soft feel, good crease resistance and excellent water repellency.

*Example VIII*

This example illustrates the preparation and use of a water repellent composition containing polyether G and epoxidized soybean oil.

100 parts of polyether G and 25 parts of epoxidized soybean oil were added to an aqueous solution containing 540 parts of water, .25 part Methocel, 1.8 parts of a copolymer of vinyl methyl ether and maleic anhydride, .5 part of a polyglycol fatty acid ester and the mixture stirred to form an emulsion.

7.5 parts of zinc fluoborate was added to the above emulsion and the emulsion padded on cotton cloth. The impregnated cloth was dried at 100° C. and cured for 5 minutes at 160° C. The cloth had soft feel, crease recovery of 133 (blank of 112) and excellent water repellency.

*Example IX*

This example illustrates the preparation and use of a water repellent composition containing polyether G and octadecenyl succinic acid.

100 parts of polyether G and 25 parts of octadecenyl succinic acid were added to an aqueous solution containing 540 parts of water, .25 part Methocel, 1.8 parts of a copolymer of vinyl methyl ether and maleic anhydride, .5 part of a polyglycol fatty acid ester and the mixture stirred to form an emulsion.

7.5 parts of zinc fluoborate was added to the above emulsion and the emulsion padded on cotton cloth. The impregnated cloth was dried at 100° C. and cured for 5 minutes at 160° C. The cloth had soft feel, good crease resistance and excellent water repellency.

Related results are obtained by replacing the octadecanethiol-1 in the above process with equivalent amounts of octadecanal-1 and eicosanal-1.

*Example X*

This example illustrates the preparation and use of a water repellent composition containing polyether G and hydrogenated dimerized linoleic acid.

100 parts of polyether G and 25 parts of the hydrogenated dimeric linoleic acid were added to an aqueous solution containing 540 parts of water, .25 part Methocel, 1.8 parts of a copolymer of vinyl methyl ether and maleic anhydride, .5 part of a polyglycol fatty acid ester and the mixture stirred to form an emulsion.

7.5 parts of zinc fluoborate was added to the above emulsion and the emulsion padded on cotton cloth. The impregnated cloth is dried at 100° C. and cured for 5 minutes at 160° C. The cloth had a soft feel, crease recovery of 123 (blank of 112) and excellent water repellency.

*Example XI*

This example illustrates the preparation and use of a water repellent composition containing polyether H and octadecanethiol.

100 parts of polyether H and 25 parts of octadecanethiol are added to an aqueous solution containing 540 parts of water, .25 part Methocel, 1.8 parts of a copolymer of vinyl methyl ether and maleic anhydride .5 part of a polyglycol fatty acid ester and the mixture stirred to form an emulsion.

7.5 parts of zinc fluoborate are added to the above emulsion and the emulsion padded on cotton cloth. The impregnated cloth is dried at 100° C. and cured for 5 minutes at 160° C. The cloth has a soft feel, good crease resistance and good water repellency.

*Example XII*

This example illustrates the preparation and use of a water repellent composition containing polyether G and pentadecyl resorcinol.

15 parts of polyether G and 10 parts of pentadecyl resorcinol were added to an aqueous solution containing 540 parts of water, .25 part Methocel, 1.8 parts of a copolymer of vinyl methyl ether and maleic anhydride, .5 part of a polyglycol fatty acid ester and the mixture stirred to form an emulsion.

.75 part of zinc fluoborate was added to the above emulsion and the emulsion padded on cotton cloth. The impregnated cloth was dried at 100° C. and cured for 5 minutes at 160° C. The cloth had a soft feel, crease recovery of 133 (blank of 78) and excellent water repellency.

The above experiment was repeated using 20 parts of the pentadecyl resorcinol instead of 10 parts. The cloth in this case had a crease recovery of 137.

Related results are obtained by replacing the pentadecyl phenol in the above process with equivalent amounts of eicosanoic acid and octadecanoic acid.

This application is a continuation-in-part of my application Serial No. 369,503, filed July 21, 1953, and now abandoned.

I claim as my invention:

1. A water repellent composition comprising an aqueous emulsion containing from 3% to 50% by weight of the water in the emulsion of a polyepoxide having a

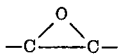

equivalency greater than 1.0 and being selected from the group consisting of glycidyl polyethers of polyhydric phenols and glycidyl polyethers of polyhydric alcohols, and 30% to 150% by weight of the said polyepoxide of a dissimilar organic compound which has a continuous chain of at least 12 aliphatic carbon atoms and at least one functional group which is reactive with epoxy groups and is selected from the group consisting of a

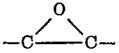

group, an anhydride group, a phenolic hydroxyl group, a carboxyl group, an amino group, an N-substituted amino group, a mercapto group and an aldehyde group, said aqueous emulsion containing a non-ionic emulsifying agent and being free of solvents.

2. A composition as defined in claim 1 wherein the polyepoxide has an epoxy equivalency between 1.1 and 3.0 and a molecular weight between 200 and 1500.

3. A composition as in claim 1 wherein the dissimilar organic compound possessing the continuous chain of at least 12 carbon atoms is an epoxidized alkene-1 containing from 16 to 32 carbon atoms.

4. A composition as in claim 1 wherein the dissimilar organic compound possessing the continuous chain of at least 12 carbon atoms is a N-hydrocarbyl substituted alkyl amine wherein the hydrocarbyl radical containing from 16 to 32 carbon atoms.

5. A composition as in claim 1 wherein the dissimilar organic compound possessing the continuous chain of at least 12 carbon atoms is an alkyl-substituted phenol wherein the alkyl group contains from 16 to 32 carbon atoms.

6. A composition as in claim 1 wherein the dissimilar organic compound possessing the continuous chain of at least 12 carbon atoms is an epoxidized unsaturated triglyceride wherein the acids used in making the triglyceride containing from 16 to 32 carbon atoms.

7. A composition for use in imparting water repellency to materials comprising an aqueous emulsion containing from 3% to 50% by weight of water of polyepoxide having an epoxy equivalency greater than 1.0 and being selected from the group consisting of glycidyl polyethers of polyhydric phenols and glycidyl polyethers of polyhydric alcohols and from 30% to 150% by weight of polyepoxide of an organic compound dissimilar to the polyepoxide described above which has a continuous chain of at least 16 aliphatic carbon atoms and a single functional group reactive with epoxy groups and is selected from the group consisting of a

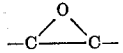

group, an anhydride group, a phenolic hydroxyl group, a carboxyl group, an amino group, an N-substituted amino group, a mercapto group and an aldehyde group, an acid and alkali-stable non-ionic emulsifying agent, a water-dispersing binding colloid and an acidic curing agent, said emulsion being free of solvents.

8. A composition as in claim 7 wherein the polyepoxide is a glycidyl polyether of 2,2-bis(4-hydroxyphenyl) propane.

9. A composition as in claim 7 wherein the polyepoxide is a glycidyl polyether of glycerol.

10. A composition as in claim 7 wherein the polyepoxide is a polymer of an alkenyl glycidyl ether.

11. A process for imparting water repellent properties to textile fabrics which comprises impregnating the fabric with an aqueous emulsion 3% to 50% by weight of water of a polyepoxide having an epoxy equivalency greater than 1.0 and being selected from the group consisting of glycidyl polyethers of polyhydric phenols and glycidyl polyethers of polyhydric alcohols and from 30% to 150% by weight of the polyepoxide of a dissimilar organic compound containing a long chain aliphatic hydrocarbon radical containing from 16 to 32 carbon atoms and a member of the group consisting of a

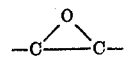

group, an anhydride group, a phenolic hydroxyl group, a carboxyl group, an amino group, an N-substituted amino group, a mercapto group and an aldehyde group, a non-ionic emulsifying agent a water-dispersible colloid and an acidic epoxy curing agent, and then heating the impregnated fabric to effect the cure of the polyepoxide, said aqueous emulsion being free of solvents.

12. A process as in claim 11 wherein the dissimilar organic compound containing the long chain hydrocarbon radical is 1,2-epoxyoctadecane.

13. A process as in claim 11 wherein the dissimilar organic compound containing the long chain hydrocarbon radical is a mixture of $C_{18}$ to $C_{24}$ alkyl amino propylamine.

14. A process as in claim 11 wherein the dissimilar organic compound containing the long chain hydrocarbon radical is pentadecyl phenol.

15. A process as in claim 11 wherein the dissimilar organic compound containing the long chain hydrocarbon radical is octadecylsuccinic anhydride.

16. A process as in claim 11 wherein the fabric is a cellulosic fabric.

17. A process for imparting water repellent properties to materials deficient in that property which comprises applying to the material an aqueous emulsion containing from 3% to 50% by weight of water in the emulsion of a polyepoxide having an epoxy equivalency greater than 1.0 and being selected from the group consisting of glycidyl polyethers of polyhydric phenols and glycidyl polyethers of polyhydric alcohols and 30% to 150% by weight of the polyepoxide of a dissimilar organic compound which has a continuous chain of at least 12 aliphatic carbon atoms and at least one functional group which is reactive with epoxy groups and is selected from the group consisting of a

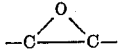

group, an anhydride group, a phenolic hydroxyl group, a carboxyl group, an amino group, an N-substituted amino group, a mercapto group and an aldehyde group, and heating to effect cure of the polyepoxide, said aqueous emulsion containing a non-ionic emulsifying agent and being free of solvents.

18. A material having improved water repellency as produced by the process of claim 17.

References Cited in the file of this patent
UNITED STATES PATENTS

| 2,637,621 | Auer | May 5, 1953 |
| 2,717,885 | Greenlee | Sept. 13, 1955 |
| 2,754,279 | Hall | July 10, 1956 |